Patented June 12, 1934

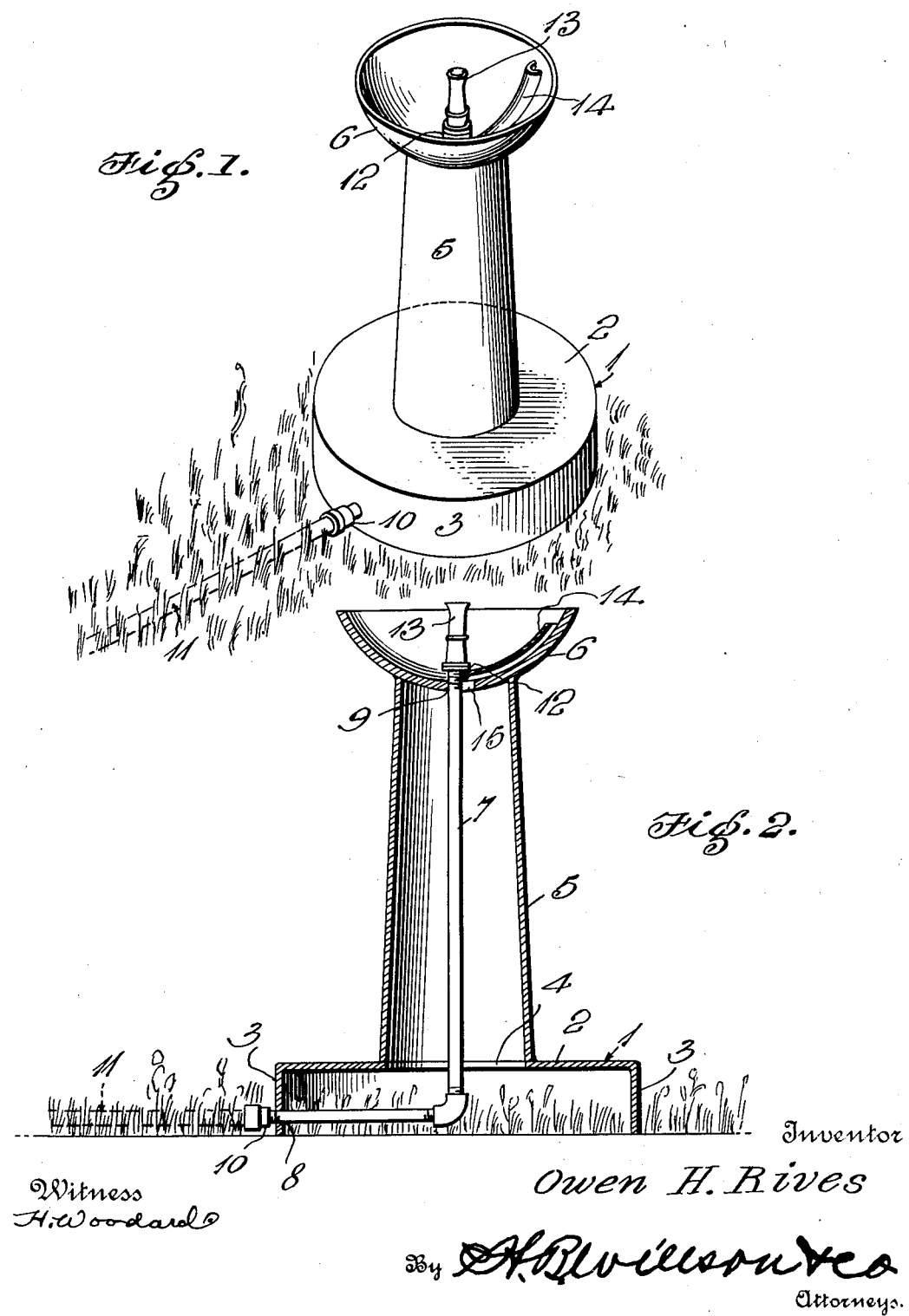

1,962,840

UNITED STATES PATENT OFFICE 1,962,840

PORTABLE FOUNTAIN

Owen H. Rives, Holdenville, Okla.

Application June 22, 1932, Serial No. 618,784

1 Claim. (Cl. 299—12)

The invention aims to provide a new, useful and ornamental fountain for lawn or flower garden, which may be easily carried to any desired place for use, may be quickly and easily connected with an ordinary hose and its nozzle, and may be used to direct a stream of water upwardly, allowing it to fall into the bowl of the device to simulate a large fountain, or may be used to discharge a spray for sprinkling purposes.

With the foregoing in view, the invention resides in the novel subject matter hereinafter described and claimed, description being accomplished by reference to the accompanying drawing.

Fig. 1 is a perspective view showing a portable fountain constructed in accordance with the invention.

Fig. 2 is a vertical sectional view.

A preferred construction has been shown and will be specifically described, with the understanding however, that within the scope of the invention as claimed, variations may be made.

The numeral 1 denotes a circular base open at its lower side but provided with a solid top 2 and a continuous side wall 3. The top 2 is formed with a central opening 4 and a tubular post 5 is secured to said top around said opening, said post being preferably tapered upwardly as shown. A bowl or basin 6 is secured upon the upper end of the post 5. The parts 1, 5 and 6 are preferably formed from sheet metal, attractively enameled, but could well be formed in one piece if desired.

An L-shaped water pipe 7 extends radially of the base 1 and vertically in the post 5, the lower end of said pipe being passed through and secured in an opening 8 in the side wall 3, while the upper end of said pipe passes through and is secured in an opening 9 in the bottom of the bowl 6. The lower end of pipe 7 is provided with a suitable connection 10 for connecting a conventional hose 11 thereto, while the upper end of said pipe is equipped with a connection 12 for engagement with a conventional hose nozzle 13. This nozzle is of course adjustable in the usual way and may be set to either direct a straight stream of water upwardly, allowing it to fall into the bowl 6 to simulate a large fountain, or said nozzle may be so set as to discharge a wide spray for sprinkling purposes. In either instance, the effect is ornamental and very pleasing.

Due to the open bottom of the base 1, said base will not downwardly mash and impair the appearance of a lawn or the like upon which it is used, for the grass within the confines of said base merely projects upwardly into the latter, as shown in Fig. 2. The open bottom of the base also allows the latter to rest with more stability upon uneven ground.

With the construction above described, I prefer to use an overflow conduit 14 secured within the bowl 6 and communicating at its lower end with an opening 15 which may be a notch in the wall of the opening 9 or may be an entirely separate opening. The conduit 14 prevents the water from overflowing from the rim of the bowl 6, maintains a constant water level in said bowl, and discharges the surplus water into the hollow post 5, so that this water will moisten the ground under the base 1 while the falling spray from the nozzle 13 is watering the ground around said base.

It will be seen that the fountain may be quickly and easily connected with the ordinary hose and its nozzle, and that whenever said hose and nozzle are to be used for other purposes, they may be readily disconnected from the fountain and reconnected with each other.

I claim:—

A portable lawn fountain and sprinkler comprising a hollow base open at its lower side to receive growing lawn grass, said base having a continuous side wall of small thickness to rest upon the lawn without mashing down any appreciable quantity of the grass, a tubular post secured to, rising from and communicating with said base, a nozzle at the upper end of said post capable of discharging a wide spray to water the lawn around said base, means for conducting water to said nozzle, and a bowl mounted on said post for catching some of the water discharged from the nozzle, said bowl having a water discharge passage communicating directly with the interior of said post, whereby the water received in said post may enter said base to water the lawn under the base while the spray from the nozzle is watering the lawn around said base.

OWEN H. RIVES.